(12) United States Patent
Banet et al.

(10) Patent No.: US 7,113,127 B1
(45) Date of Patent: Sep. 26, 2006

(54) WIRELESS VEHICLE-MONITORING SYSTEM OPERATING ON BOTH TERRESTRIAL AND SATELLITE NETWORKS

(75) Inventors: Matthew Banet, Del Mar, CA (US); Larkin Lowrey, La Jolla, CA (US); Paul Washicko, Carlsbad, CA (US); Michael O'Brien, Temecula, CA (US)

(73) Assignee: Reynolds and Reynolds Holdings, Inc., Dayton, OH (US)

( * ) Notice: Subject to any disclaimer, the term of this patent is extended or adjusted under 35 U.S.C. 154(b) by 0 days.

(21) Appl. No.: 10/625,942

(22) Filed: Jul. 24, 2003

(51) Int. Cl.
*G01S 5/14* (2006.01)
*G01M 17/007* (2006.01)

(52) U.S. Cl. .................. 342/357.07; 701/29; 701/35; 342/357.1

(58) Field of Classification Search ........... 342/357.07, 342/357.1, 357.13; 701/29, 35, 213
See application file for complete search history.

(56) References Cited

U.S. PATENT DOCUMENTS

| | | | |
|---|---|---|---|
| 3,748,894 A | 7/1973 | White et al. | |
| 4,258,421 A | 3/1981 | Juhasz et al. | |
| 4,602,127 A | 7/1986 | Neely et al. | |
| 4,690,475 A | 9/1987 | McElroy | |
| 4,694,408 A | 9/1987 | Zaleski | |
| 4,926,330 A | 5/1990 | Abe et al. | |
| 4,956,777 A | 9/1990 | Cearley et al. | |
| 5,003,317 A | 3/1991 | Gray et al. | |
| 5,026,293 A | 6/1991 | Wilson | |
| 5,050,080 A | 9/1991 | Abe | |
| 5,157,610 A | 10/1992 | Asano et al. | |
| 5,223,844 A | 6/1993 | Mansell et al. | |
| 5,289,378 A | 2/1994 | Miller et al. | |
| 5,343,906 A | 9/1994 | Tibbals, III | |
| 5,442,553 A | 8/1995 | Parrillo | |
| 5,450,321 A | 9/1995 | Crane | |
| 5,463,567 A | 10/1995 | Boen et al. | |
| 5,473,540 A | 12/1995 | Schmitz | |
| 5,479,479 A | 12/1995 | Braitberg et al. | |
| 5,491,486 A | * 2/1996 | Welles et al. .......... | 342/357.07 |
| 5,532,927 A | 7/1996 | Pink et al. | |

(Continued)

FOREIGN PATENT DOCUMENTS

CA   21336713 A1 * 10/1994

(Continued)

OTHER PUBLICATIONS

Definition of "Chipset" from Wikpedia.*

(Continued)

*Primary Examiner*—Gregory C. Issing
(74) *Attorney, Agent, or Firm*—Stephen C. Glazier; Kirkpatrick & Lockhart Nicholson Graham LLP

(57) ABSTRACT

Embodiments of the present invention provide a wireless appliance for monitoring a vehicle. The wireless appliance includes a microprocessor configured to select a vehicle-communication protocol of a host vehicle, and then communicate with the host vehicle through the vehicle-communication protocol. The appliance also includes a vehicle-communication circuit, in electrical communication with the microprocessor, which collects diagnostic data from the host vehicle using the vehicle-communication protocol. A GPS module, also in electrical communication with the microprocessor, generates location-based data. For transmitting these data, the appliance includes a first wireless transmitter operating on a terrestrial network and a second wireless transmitter operating on a satellite network. The microprocessor selects the first or second wireless transmitter for transmitting the diagnostic and location-based data.

53 Claims, 10 Drawing Sheets

U.S. PATENT DOCUMENTS

| | | |
|---|---|---|
| 5,537,336 A | 7/1996 | Joyce |
| 5,550,551 A | 8/1996 | Alesio |
| 5,574,427 A | 11/1996 | Cavallaro |
| 5,671,141 A | 9/1997 | Smith et al. |
| 5,673,305 A | 9/1997 | Ross |
| 5,680,328 A | 10/1997 | Skorupski et al. |
| 5,732,074 A | 3/1998 | Spaur et al. |
| 5,737,215 A | 4/1998 | Schricker et al. |
| 5,754,965 A | 5/1998 | Hagenbuch |
| 5,758,300 A | 5/1998 | Abe |
| 5,774,828 A | 6/1998 | Brunts et al. |
| 5,781,871 A | 7/1998 | Mezger et al. |
| 5,797,134 A | 8/1998 | McMillan et al. |
| 5,798,647 A | 8/1998 | Martin et al. |
| 5,808,907 A | 9/1998 | Shetty et al. |
| 5,828,585 A | 10/1998 | Welk et al. |
| 5,850,209 A | 12/1998 | Lemke et al. |
| 5,884,202 A | 3/1999 | Arjomand |
| 5,928,292 A | 7/1999 | Miller et al. |
| 5,941,918 A | 8/1999 | Blosser |
| 5,964,821 A | 10/1999 | Brunts et al. |
| 6,064,970 A | 5/2000 | McMillan et al. |
| 6,104,988 A | 8/2000 | Klarer |
| 6,141,611 A | 10/2000 | Mackey et al. |
| 6,154,658 A * | 11/2000 | Caci .................. 455/466 |
| 6,167,426 A | 12/2000 | Payne et al. |
| 6,236,933 B1 | 5/2001 | Lang |
| 6,240,295 B1 * | 5/2001 | Kennedy et al. ......... 455/456.4 |
| 8,263,268 | 7/2001 | Nathanson |
| 6,285,953 B1 | 9/2001 | Harrison et al. |
| 8,295,492 | 9/2001 | Lang et al. |
| 6,338,152 B1 | 1/2002 | Fera et al. |
| 6,339,745 B1 | 1/2002 | Novik |
| 6,354,868 B1 | 3/2002 | Korczynski et al. |
| 6,356,205 B1 | 3/2002 | Salvo et al. |
| 6,356,823 B1 | 3/2002 | Iannotti et al. |
| 6,400,701 B1 | 6/2002 | Lin et al. |
| 6,408,232 B1 | 6/2002 | Cannon et al. |
| 6,429,773 B1 | 8/2002 | Schuyler |
| 6,442,460 B1 | 8/2002 | Larson et al. |
| 6,459,988 B1 | 10/2002 | Fan et al. |
| 6,487,479 B1 | 11/2002 | Nelson |
| 6,487,494 B1 | 11/2002 | Odinak et al. |
| 6,487,717 B1 | 11/2002 | Brunemann et al. |
| 6,496,777 B1 | 12/2002 | Tennison et al. |
| 6,502,030 B1 | 12/2002 | Hilleary |
| 6,505,106 B1 | 1/2003 | Lawrence et al. |
| 6,507,786 B1 | 1/2003 | Flick |
| 6,522,267 B1 | 2/2003 | Flick |
| 6,526,335 B1 * | 2/2003 | Treyz et al. .................. 701/1 |
| 6,526,460 B1 | 2/2003 | Dauner et al. |
| 6,529,159 B1 | 3/2003 | Fan et al. |
| 6,552,682 B1 | 4/2003 | Fan et al. |
| 6,556,889 B1 | 4/2003 | Rudick et al. |
| 6,556,905 B1 | 4/2003 | Mittelsteadt et al. |
| 6,564,127 B1 | 5/2003 | Bauerle et al. |
| 6,580,916 B1 | 6/2003 | Weisshaar et al. |
| 6,594,576 B1 | 7/2003 | Fan et al. |
| 6,594,579 B1 | 7/2003 | Lowrey et al. |
| 6,604,032 B1 | 8/2003 | Moller |
| 6,604,033 B1 | 8/2003 | Banet et al. |
| 6,604,038 B1 | 8/2003 | Lesesky et al. |
| 6,609,051 B1 | 8/2003 | Fiechter et al. |
| 6,611,686 B1 | 8/2003 | Smith et al. |
| 6,611,739 B1 | 8/2003 | Harvey et al. |
| 6,611,740 B1 | 8/2003 | Lowrey et al. |
| 6,611,755 B1 | 8/2003 | Coffee et al. |
| 6,636,790 B1 | 10/2003 | Lightner et al. |
| 6,664,922 B1 | 12/2003 | Fan |
| 6,675,081 B1 | 1/2004 | Shuman et al. |
| 6,687,587 B1 | 2/2004 | Kacel |
| 6,694,234 B1 | 2/2004 | Lockwood et al. |
| 6,718,425 B1 | 4/2004 | Pajakowski et al. |
| 6,732,031 B1 | 5/2004 | Lightner et al. |
| 6,732,032 B1 | 5/2004 | Banet et al. |
| 6,751,452 B1 | 6/2004 | Kupczyk et al. |
| 6,754,485 B1 | 6/2004 | Obradovich et al. |
| 6,795,017 B1 | 9/2004 | Puranik et al. |
| 6,832,140 B1 | 12/2004 | Fan et al. |
| 6,836,708 B1 | 12/2004 | Tripathi |
| 6,845,362 B1 | 1/2005 | Furuta et al. |
| 6,862,524 B1 | 3/2005 | Nagda et al. |
| 6,867,733 B1 | 3/2005 | Sandhu et al. |
| 6,882,313 B1 | 4/2005 | Fan et al. |
| 6,889,064 B1 | 5/2005 | Baratono et al. |
| 6,922,566 B1 | 7/2005 | Puranik et al. |
| 2001/0016789 A1 | 8/2001 | Staiger |
| 2001/0033225 A1 | 10/2001 | Razavi et al. |
| 2002/0008644 A1 | 1/2002 | Flick |
| 2002/0008645 A1 | 1/2002 | Flick et al. |
| 2002/0016655 A1 | 2/2002 | Joao |
| 2002/0029101 A1 | 3/2002 | Larson et al. |
| 2002/0032505 A1 | 3/2002 | Good |
| 2002/0078458 A1 | 6/2002 | Furon et al. |
| 2002/0118222 A1 | 8/2002 | Fogarty |
| 2002/0133273 A1 | 9/2002 | Lowrey et al. |
| 2002/0140545 A1 | 10/2002 | Nietupski et al. |
| 2002/0143446 A1 | 10/2002 | Rogers et al. |
| 2002/0150050 A1 * | 10/2002 | Nathanson .................. 370/241 |
| 2002/0173889 A1 | 11/2002 | Odinak et al. |
| 2002/0177476 A1 * | 11/2002 | Chou ........................ 455/574 |
| 2003/0004623 A1 * | 1/2003 | Namaky et al. .............. 701/29 |
| 2003/0004624 A1 | 1/2003 | Wilson et al. |
| 2003/0009270 A1 | 1/2003 | Breed |
| 2003/0078722 A1 | 4/2003 | Odinak et al. |
| 2003/0083809 A1 | 5/2003 | Hatano |
| 2003/0093204 A1 | 5/2003 | Adachi et al. |
| 2003/0130005 A1 * | 7/2003 | Weisshaar et al. .......... 455/525 |
| 2003/0130774 A1 | 7/2003 | Tripathi et al. |
| 2003/0139179 A1 | 7/2003 | Fuchs et al. |
| 2003/0147534 A1 | 8/2003 | Ablay et al. |
| 2003/0182055 A1 * | 9/2003 | Curatolo et al. ............ 701/207 |
| 2003/0231118 A1 | 12/2003 | Kitson |
| 2003/0236596 A1 | 12/2003 | Eisenmann et al. |
| 2004/0023645 A1 | 2/2004 | Olsen et al. |
| 2004/0039502 A1 | 2/2004 | Wilson et al. |
| 2004/0044454 A1 | 3/2004 | Ross et al. |
| 2004/0104842 A1 | 6/2004 | Drury et al. |
| 2004/0196182 A1 * | 10/2004 | Unnold .................. 342/357.07 |
| 2005/0144318 A1 | 6/2005 | Chang |

FOREIGN PATENT DOCUMENTS

| | | |
|---|---|---|
| EP | 0816820 A2 | 1/1998 |
| WO | WO 00/40038 | 7/2000 |
| WO | WO 00/79727 | 12/2000 |

OTHER PUBLICATIONS

U.S. Appl. No. 09/776,033, filed Feb. 1, 2001, Banet et al.
U.S. Appl. No. 09/808,690, filed Mar. 14, 2001, Lowrey et al.
U.S. Appl. No. 09/922,954, filed Aug. 6, 2001, Lowrey et al.
U.S. Appl. No. 10/810,373, filed Mar. 26, 2004, Lowrey et al.
U.S. Appl. No. 10/823,478, filed Apr. 13, 2004, Williams et al.
U.S. Appl. No. 10/831,952, filed Apr. 26, 2004, Hunt et al.
U.S. Appl. No. 10/841,724, filed May 7, 2004, Lightner et al.
RD-422061 A; Anonymous; Jun. 10, 1999; Abstract, Using Internet for vehicle diagnostics-enabling using to operate vehicle personal computer to direct web browser to vehicle diagnostics website. . .
Bary W. Wilson et al., Modular system for multiparameter in-line machine fluid analysis (Technology showcase Apr. 3-6, 2000).
U.S. Appl. No. 09/776,083, filed Feb. 1, 2001, Banet et al.
U.S. Appl. No. 09/776,106, filed Feb. 1, 2001, Lightner et al.
U.S. Appl. No. 09/804,888, filed Mar. 13, 2001, Lowrey et al.
U.S. Appl. No. 09/908,440, filed Jul. 18, 2001, Lightner et al.

U.S. Appl. No. 10/301,010, filed Nov. 21, 2001, Lightner et al.
U.S. Appl. No. 10/431,947, filed May 8, 2003, Hunt et al.
U.S. Appl. No. 10/447,713, filed May 29, 2003, Lightner et al.
U.S. Appl. No. 10/456,246, filed Jun. 6, 2003, Lowrey et al.
U.S. Appl. No. 10/456,788, filed Jun. 6, 2003, Banet et al.
U.S. Appl. No. 10/614,665, filed Jul. 7, 2003, Lowrey et al.
U.S. Appl. No. 10/615,516, filed Jul. 8, 2003, Lightner et al.
U.S. Appl. No. 10/626,779, filed Jul. 24, 2003, Lightner et al.
U.S. Appl. No. 10/626,810, filed Jul. 24, 2003, Lowrey et al.

U.S. Appl. No. 10/623,033, filed Jul. 31, 2003, Banet et al.
U.S. Appl. No. 10/440,596, filed May 9, 2003, Lang et al.

Frank Di Genova, Thomas C. Austin, S. Kingsley Macomber (Sierra Research, Inc.). Incorporation of Wireless Communications into Vehicle On-Board Diagnostic (OBD) Systems. Report No. SR00-01-03 prepared for California Air Resources Board. Jan. 18, 2000.

* cited by examiner

| | | |
|---|---|---|
| SUPPIDS | 0xbf0fb980 | PIDs SUPPORTED |
| EVLSUP | rcfmrCFM E00osehC e00osehC | Eval supported/status |
| MIL | on | MIL light |
| NUMDTC | 1 | No. of DTCs |
| FUEL1 | closed | Fuel system status |
| LOAD | 10.2% | Calculated load value |
| ECT | 188 degF | Engine coolant temp |
| SRFT1 | 5.5% | Short term fuel trim bank 1 |
| LNGF1 | 0.8% | Long term fuel trim bank 1 |
| RPM | 952 RPM | Engine speed |
| VSS | 24 MPH | Vehicle speed |
| SPARK | 9 deg | Ignition timing (ATDC) |
| IAT | 100 degF | Intake air temp |
| MAF | 5.62 gm/s | Air flow rate |
| TP | 25.5 % | Throttle position |
| O2SLO | B1S1 B1S2 B2S1 B2S2 | O2 sensor location |
| O2S11 | 0.0% | O2 bank 1 sensor 1 |
| O2S11V | 0.055 V | O2 bank 1 sensor 1 |
| O2S12 | 100.0 % | O2 bank 1 sensor 2 |
| O2S12V | 0.100 V | O2 bank 1 sensor 2 |
| O2S21 | 3.1 % | O2 bank 2 sensor 1 |
| O2S21V | 0.070 V | O2 bank 2 sensor 1 |
| O2S22 | 100.0 % | O2 bank 2 sensor 2 |
| O2S22V | 0.040 V | O2 bank 2 sensor 2 |
| ODO | 6175 mi | Odometer |
| AIR | 15541792 gm | Total air mass |
| LRPM | 1711390 Klrpm | Total load*RPM |
| BATV | 14.0 V | Battery (on) |
| BATVOFF | 13.4 V | Battery (off) |
| RESETS | 17 | Resets |
| MANUF | 0x02100000 | Manuf codes |
| TRIPS | 738 | Trips |
| KEYON | 2m 58s-> 176 sec | Keyon time |
| RUN | 12d 5h 5m 55s -> 1055155 sec | Run time |
| DTC_C | P0743 | OBD DTCs |
| SCHEMA | 0x3b901783 GENERIC v2032 | Schema |
| MPAK_BASE | 22 | Mobitex base station base ID |
| MPAK_AREA | 39 | Mobitex base station area ID |
| MPAK_RSSI | -79 dBuV | Received signal strength indicator |

FIG.4

WIRELESS VEHICLE-MONITORING SYSTEM OPERATING ON BOTH TERRESTRIAL AND SATELLITE NETWORKS

BACKGROUND

1. Field

Embodiments of the present invention relate generally to vehicle telematics. More specifically, embodiments relate to wireless, internet-based systems that collect, transmit, and analyze diagnostic and location-based data from a motor vehicle.

2. Description of Related Art

Telematics systems typically collect data from a remote vehicle and wirelessly transmit these data to a central computer system. The computer system then analyzes the data to monitor the vehicle. Conventional telematics systems collect diagnostic data, measured from the host vehicle's engine computer, and location-based data, measured with a global positioning system (GPS).

Telematics systems that monitor light-duty automobiles and trucks beginning with model year 1996 measure data from the vehicle's on-board diagnostic (OBD-II) system. OBD-II systems, as mandated by the Environmental Protection Agency (EPA), monitor the vehicle's electrical, mechanical, and emissions systems and generate data that are processed by an engine control unit (ECU) to detect malfunctions or deterioration in the vehicle's performance. Communication protocols used to access OBD-II data include J1850 PWM (Ford vehicles), J1850 VPWM (General Motors), ISO 9141-2 (Toyota), KWP2000 (Hyundai, Mercedes), and CAN (proposed for next-generation vehicles). Data monitored with these protocols typically include parameters such as vehicle speed (VSS), engine speed (RPM), engine load (LOAD), and mass air flow (MAF). The ECU can also generate diagnostic trouble codes (DTCs), which are 5-digit codes (e.g., 'P0001') indicating electrical/mechanical problems with the vehicle. Most vehicles manufactured after 1996 include a standardized, 16-cavity serial connector that makes these data available. This OBD-II connector serially communicates with the vehicle's ECU and typically lies underneath the vehicle's dashboard.

The primary communication protocol for collecting diagnostic data from medium and heavy-duty trucks is called J1708/J1587 (referred to herein as 'J1708'). This communication protocol, which originated in 1988, typically accesses a set of data that is much larger than that available from light-duty cars and trucks. Most medium and heavy-duty trucks include a 6-cavity connector, which connects to the truck's engine computer to make these data available.

A variety of wireless networks can transmit diagnostic and GPS data from a vehicle's telematics device to the central computer system. Terrestrial networks, i.e. networks with terrestrial base stations or transmitting towers, include CDMA networks (managed by Sprint and Verizon), GSM/GPRS networks (ATT, T-Mobile), Mobitex (Cingular), DataTac (Motient), and Reflex (Arch Pagenet, Weblink Wireless). These networks typically have good coverage within a given country's major population centers, but poor coverage in rural, un-populated areas. And individual terrestrial networks typically do not offer coverage in multiple countries. Satellite networks (managed, e.g., by Orbcomm or Globalstar) typically transmit data with lower bandwidth and higher costs compared to terrestrial networks, but offer near-worldwide coverage.

BRIEF DESCRIPTION OF THE DRAWINGS

FIG. 4 is a screen capture of a web page that displays a vehicle's diagnostic data monitored by the wireless appliance of FIG. 1 according to an embodiment of the present invention.

DETAILED DESCRIPTION

Figure 1:
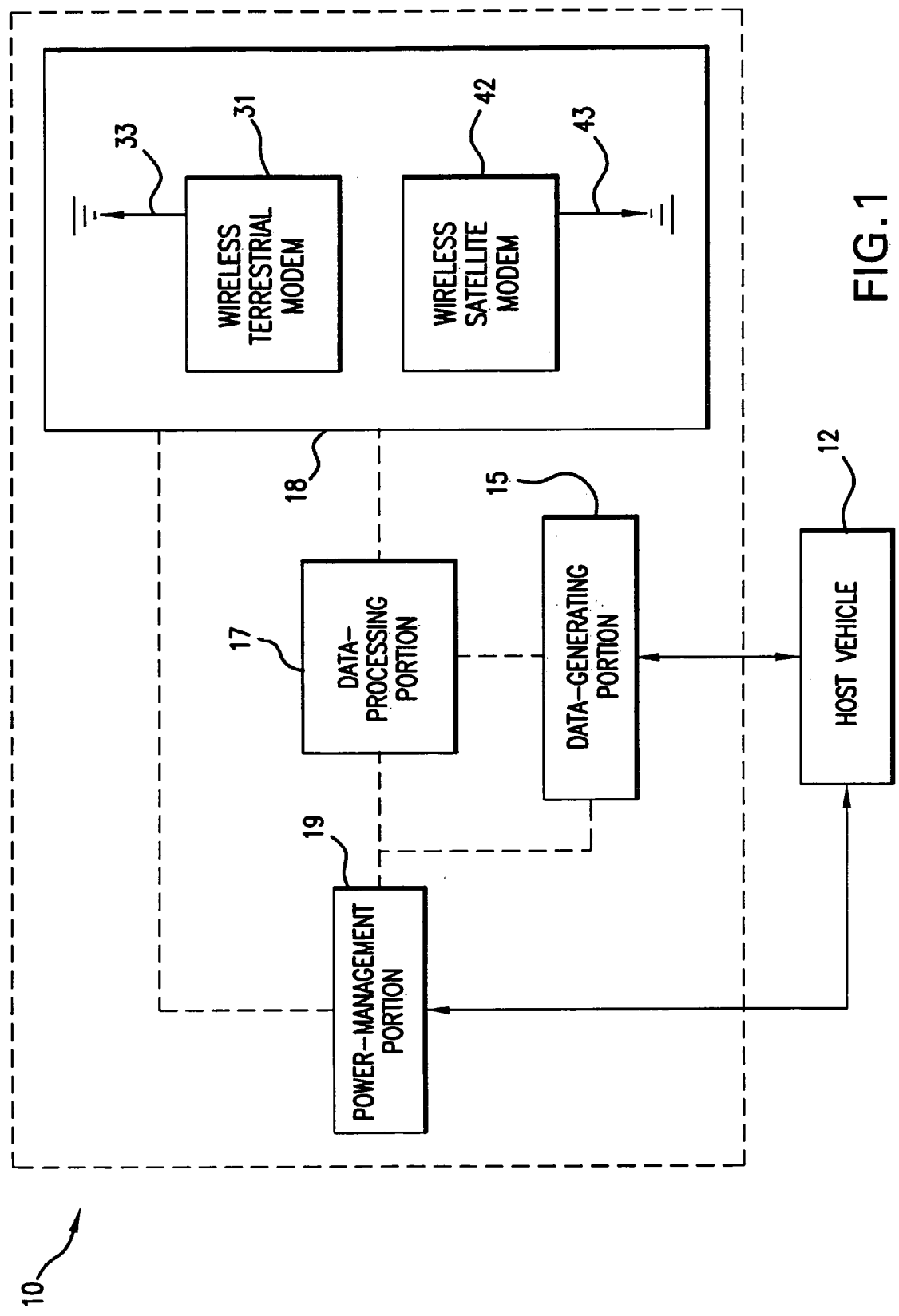
FIG. 1 is a schematic drawing of a wireless appliance according to an embodiment of the present invention featuring modems that independently operate on satellite and terrestrial networks.

The following description refers to the accompanying drawings that illustrate certain embodiments of the present invention. Other embodiments are possible and modifications may be made to the embodiments without departing from the spirit and scope of the invention. Therefore, the following detailed description is not meant to limit the present invention. Rather, the scope of the present invention is defined by the appended claims.

Embodiments of the present invention provide a small-scale, wireless, internet-based system for monitoring and analyzing a vehicle's GPS and diagnostic data. Specific embodiments provide a system that supports the above-mentioned functions using a wireless appliance that features a first modem operating on a terrestrial network, and a second modem operating on a satellite network. The wireless appliance includes a microprocessor that, for a given location, determines the coverage of the terrestrial and/or satellite networks, analyzes the coverage, and selects a modem and network for data transmission, and then transmits the data accordingly. This results in a cost-efficient system that can monitor remote vehicles with essentially worldwide coverage.

The wireless appliance monitors location and diagnostic data to provide services such as remote determination of a vehicle's mechanical and/or electrical condition, roadside assistance to a disabled vehicle, or recovery of a stolen vehicle. In a related implementation, the appliance provides a GPS-based system for alerting a vehicle's owner that someone other than the owner has moved the vehicle (e.g., the vehicle has been stolen or towed).

More specifically, in one aspect, the invention provides a wireless appliance for monitoring a vehicle that features a microprocessor configured to select a vehicle-communication protocol of a host vehicle, and then communicate with the host vehicle through the vehicle-communication protocol. The appliance includes a vehicle-communication circuit, in electrical communication with the microprocessor, that collects diagnostic data from the host vehicle using the vehicle-communication protocol. A GPS module, also in electrical communication with the microprocessor, generates location-based data. For transmitting these data, the appliance includes a first wireless transmitter operating on a terrestrial network and a second wireless transmitter operating on a satellite network. The microprocessor is further configured to select the first or second wireless transmitter for transmitting the diagnostic and location-based data.

In another aspect, the invention provides a wireless appliance that includes a microprocessor, a GPS module, and the above-described first and second wireless transmitters. In this embodiment, the wireless transmitters transmit location-based data to an Internet-accessible website.

In various embodiments, the vehicle-communication circuit of the wireless appliance includes modules for managing different vehicle-communication protocols, e.g. J1850 PWM (a protocol for Ford vehicles), J1850 VPWM (General Motors), ISO 9141-2 (Toyota and other Japanese makes), CAN (e.g. ISO-15765; a next-generation protocol), Keyword 2000 (Hyundai, Mercedes), and J1708 (for medium and heavy-duty trucks).

The microprocessor may run firmware that determines the vehicle-communication protocol of a host vehicle. Once this is determined, the microprocessor may select the appropriate module in the vehicle-communication circuit that supports the vehicle-communication protocol.

The wireless appliance can also include an internal battery. In this embodiment, the appliance receives power from the vehicle's standard 12-volt battery and uses the internal battery as a back-up power supply in case this power is interrupted. In another embodiment, the appliance includes a single chipset that includes both the GPS module and both of the wireless transmitters.

In another aspect of the invention, the wireless appliance features a microprocessor that controls and processes data from both the vehicle-communication circuit and the GPS module. In this case, the GPS module receives GPS signals from an antenna and generates data (e.g., a GPS 'fix' that includes the vehicle's latitude, longitude, altitude, heading, and speed) in response. The GPS module then sends the data to the microprocessor to calculate location-based data. In this embodiment, both the GPS and radio antennae may be housed with the wireless appliance in a single enclosure. In other embodiments, a single chipset or ASIC includes both the GPS module and both the wireless transmitters.

The invention has many advantages. In particular, embodiments according to the invention make it possible to monitor diagnostic and location-based data from a vehicle located virtually anywhere in the world. These data are transmitted in real-time to an Internet-accessible website, which makes it possible to characterize the vehicle's performance and determine its location from virtually any location that has Internet access.

The satellite and terrestrial modems can be integrated into a single chipset or application-specific integrated circuit ('ASIC') to reduce both the cost and size of the wireless appliance. The ASIC may also include a microcontroller (e.g., an ARM7 microcontroller), computer memory, and the GPS. In this way a small, compact housing can enclose the wireless appliance. This makes it possible to hide the appliance in a host vehicle, thus making it unnoticeable to a thief during theft of the vehicle.

Diagnostic and location-based data, when analyzed together, can improve conventional services such as roadside assistance, vehicle theft notification and recovery, and remote diagnostics. For example, the data can indicate a vehicle's location, its fuel level and battery voltage, and whether or not it has any active DTCs. With these data a call center can dispatch a tow truck with the appropriate materials (e.g., extra gasoline or tools required to repair a specific problem) to repair the vehicle accordingly.

A wireless appliance according to embodiments of the present invention can also be easily transferred from one vehicle to another, or easily replaced if it malfunctions. No additional wiring is required to install the appliance; it is powered through the vehicle's OBD-II or J1708 connector and using a back-up battery. The appliance can also be connected directly to a vehicle's electrical system, thus making it unnecessary to even use the above-mentioned connectors.

Embodiments of the present invention may be useful in a wide range of vehicles. Examples of such vehicles include automobiles and trucks, as well as commercial equipment, medium and heavy-duty trucks, construction vehicles (e.g., front-end loaders, bulldozers, forklifts), powered sport vehicles (e.g., motorboats, motorcycles, all-terrain vehicles, snowmobiles, jet skis, and other powered sport vehicles), collision repair vehicles, marine vehicles, and recreational vehicles. Further, embodiments may be useful in the vehicle care industry.

Although diagnostic systems operating under OBD-II and J1708 communication protocols are disclosed herein for illustrative purposes, it is to be appreciated that embodiments of the present invention may be employed with other systems.

FIG. 1 is a schematic drawing of a wireless appliance 10 according to an embodiment of the present invention. The wireless appliance 10 features a data-generating portion 15 that generates diagnostic and location-based data from a host vehicle 12, and a data-processing portion 17 that receives and processes these data. The data-processing portion 17 additionally formats the data for wireless transmission through a data-transmitting portion 18 to an Internet-accessible central computer system, described in more detail below. A power-management portion 19 powers the data-generating 15, data-processing 17, and data-transmitting 18 portions.

The data-transmitting portion 18 features a wireless terrestrial modem 31 that transmits data through a first antenna 33 to a terrestrial network, and a wireless satellite modem 42 that transmits data through a second antenna 43 to a satellite network. To determine the appropriate network for transmission, the data-processing portion 17 analyzes the location-based wireless coverage provided by the terrestrial and satellite networks. In one implementation, the analysis may include analyzing radio-frequency signal strengths, indicating the location-based coverage of each network, as detected by the first 33 and second 43 antennae.

Terrestrial networks typically offer higher bandwidths and lower transmission costs compared to satellite networks.

Data is therefore sent over terrestrial networks if the data-processing portion 17 determines such networks offer sufficient coverage. If the coverage provided by the terrestrial network is insufficient, the data-processing portion 17 sends the data over the satellite network, which offers worldwide coverage.

In an embodiment, the first 33 and/or second 43 antennae may include a decal or patch antenna. For example, the wireless satellite modem 42 of FIG. 1 may be connected to a decal antenna. The decal antenna may be inconspicuously affixed to a surface of a host vehicle, such as a window.

Figure 2:
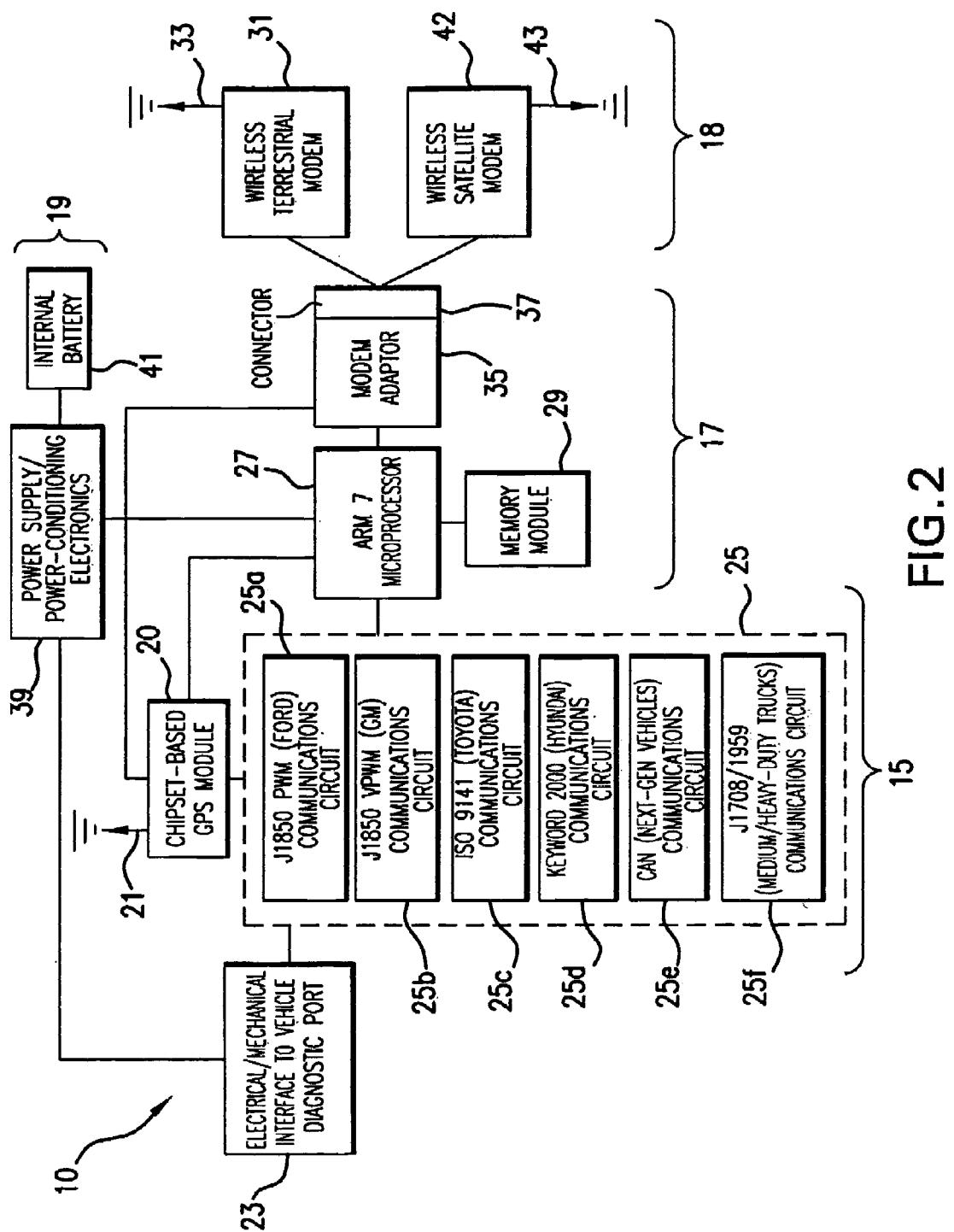
FIG. 2 is a schematic drawing of a wireless appliance according to an embodiment of the present invention featuring modems that independently operate on satellite and terrestrial networks, a GPS, and a vehicle-communication system that communicates with multiple types of vehicle buses.

FIG. 2 shows a more detailed embodiment of the wireless appliance 10 of FIG. 1. The data-generating portion 15 features a chipset-based GPS module 20 that receives wireless signals from orbiting GPS satellites through an integrated GPS antenna 21. To reduce cabling in the wireless appliance 10 and costs associated with its installation, the integrated GPS antenna 21 may attach to a metal ground plane within the appliance. Once the antenna 21 receives signals from at least three satellites, the GPS module 20 processes the signals to calculate a GPS fix that features the host vehicle's location and heading. The GPS module 20 calculates location-based data at a programmable interval, e.g. every minute.

The data-generating portion 15 communicates with the host vehicle through an electrical/mechanical interface 23 that connects to the host vehicle's 16-cavity OBD-II diagnostic connector (for light-duty cars and trucks) or 6-cavity J1708 diagnostic connector (for medium and heavy-duty trucks). The diagnostic connector, typically located underneath the vehicle's steering column, provides direct access to diagnostic data stored in memory in the vehicle's ECU. The data-generating portion 15 features a vehicle-communication circuit 25 that communicates with the host vehicle through an electrical/mechanical interface 23 with separate modules 25a–25f for different vehicle buses (e.g., those featured in Ford, GM, Toyota, Hino). The vehicle-communication circuit 25 can be integrated into a single ASIC wherein each module 25a–25f is a separate integrated circuit. Example implementations of these modules are described in copending U.S. patent application Ser. No. 10/431,947, filed May 8, 2003, the contents of which are incorporated herein by reference.

The vehicle-communication circuit 25 can additionally include logic that detects the communication protocol of the host vehicle, and then selects this protocol to communicate with the vehicle. Once the protocol is selected, the electrical/mechanical interface 23 receives diagnostic data from the vehicle and passes it through the vehicle-communication circuit 25 to the data-processing portion 17 for analysis.

It is to be appreciated that the specific protocols supported by the vehicle-communication circuit 25 of FIG. 2 are merely examples. In some embodiments, more, fewer, or other protocols may be supported by a vehicle-communication circuit.

The data-processing portion 17 features a 16-bit ARM7 microprocessor 27 that receives and processes diagnostic data from the vehicle-communication circuit 25 and location-based data from the GPS module 20. For example, the microprocessor 27 can process diagnostic data describing the host vehicle's speed, mass air flow, and malfunction indicator light to calculate, respectively, an odometer reading, fuel efficiency, and emission status.

The microprocessor 27 additionally stores firmware and pre and/or post-processed diagnostic data in a memory module 29. The memory module 29 may additionally store an operating system (e.g., Linux) that runs on the microprocessor 27. During operation, the memory module 29 can additionally function as a data logger where diagnostic and location-based data are captured at high rates (e.g., every 200 milliseconds) and then read out at a later time.

With firmware the microprocessor 27 determines whether to use the satellite modem 42 or terrestrial modem 31 to transmit the data. The microprocessor 27 determines this by analyzing the coverage of the associated terrestrial or satellite networks. The microprocessor 27 then formats the diagnostic and location-based data into separate packets and serially transfers these packets through a modem adaptor 35, which in turn routes the packets to the appropriate wireless modem. The modem adaptor 35 provides power, mechanical support, and a serial interface to both the wireless terrestrial modem 31 and satellite modem 42 through a multi-pin mechanical connector 37. Each formatted packet includes, e.g., a header that describes its destination and the wireless modem's numerical identity (e.g., a phone or serial number) and a payload that includes the data. Once transmitted, the packets propagate through the network, which delivers them to an Internet-accessible website, for example, as described in more detail with reference to FIG. 3A.

The power-management portion 19 of the wireless appliance 10 features a power supply and power-conditioning electronics 39 that receive 12 volts DC power from the electrical/mechanical interface 23 and, in turn, supply regulated DC power to circuit elements in the data-generating 15 and data-processing 17 portions. Typically the 12 volts is from the vehicle's battery and is switched to a lower voltage, e.g., 3.3–5 volts, to power the circuit elements. The mechanical interface 23, in turn, attaches to the host vehicle's diagnostic connector, which receives power directly from the vehicle's battery. An internal battery 41 connects to the power supply and power-conditioning electronics 39 and supplies power in case the wireless appliance is disconnected from the vehicle's power-supplying diagnostic connector. Additionally, the power supply and power-conditioning electronics 39 can continually recharge the internal battery 41 so that it can supply back-up power even after extended use.

Figure 3A:
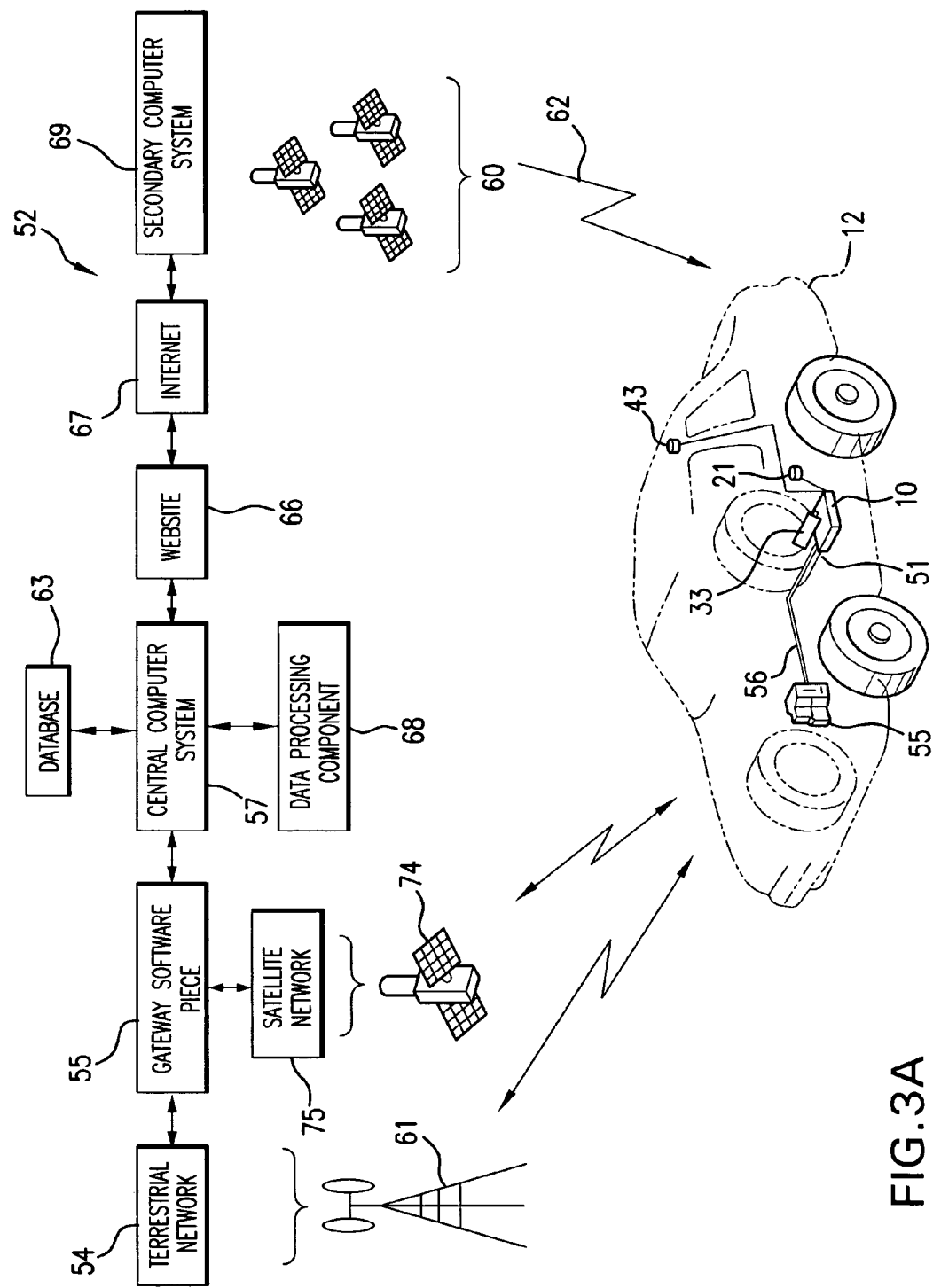
FIG. 3A is a schematic drawing of a system according to an embodiment of the invention that collects diagnostic and GPS data from a vehicle and transmits these data through either a satellite or terrestrial network to a central computer system.

FIG. 3A shows a schematic drawing of an Internet-based system 52 that uses the above-described wireless appliance 10, or related embodiments thereof, to monitor both diagnostic and location-based data from a host vehicle 12. In the embodiment shown in the figure, the wireless appliance 10 connects to a host vehicle's OBD-II diagnostic connector 51 and collects diagnostic data by querying the vehicle's ECU 55 through a cable 56. In response to a query, the ECU 55 retrieves data stored in its memory and sends it along the same cable 56 back to the wireless appliance 10. The GPS module in the wireless appliance 10 measures the vehicle's location-based data using an antenna 21 that is typically integrated into the wireless appliance or hidden within the vehicle (e.g., under the vehicle's dashboard). To calculate the vehicle's location, the antenna 21 collects signals 62 from an overlying constellation of GPS satellites 60 and sends these signals 62 to the GPS module for processing.

During operation, the wireless appliance 10 formats the diagnostic and GPS data in separate data packets. Using a first antenna 33, the wireless appliance determines the coverage provided by a terrestrial network 54 featuring a terrestrial base station 61. If this coverage is sufficient the wireless appliance 10 transmits the formatted packets through the terrestrial network 54. Alternatively, if the coverage provided by the terrestrial network 54 is not sufficient, the wireless appliance 10 transmits the formatted packets through a satellite network 75 featuring at least one data-transmitting satellite 74.

Once received by either the terrestrial 54 or satellite 75 networks, the data packets propagate to a gateway software piece 55 running on a central computer system 57. Using the gateway software piece 55, the central computer system 57 processes and stores data from the data packets in a database 63. The central computer system 57 additionally may host a website 66 that, once accessed, displays the data. A user (e.g. an individual working for a call center) accesses the website 66 with a secondary computer system 69 through the Internet 67. The central computer system 57 may also include a data-processing component 68 that processes data in the database 63 to further characterize the vehicle 12.

Figure 3B:
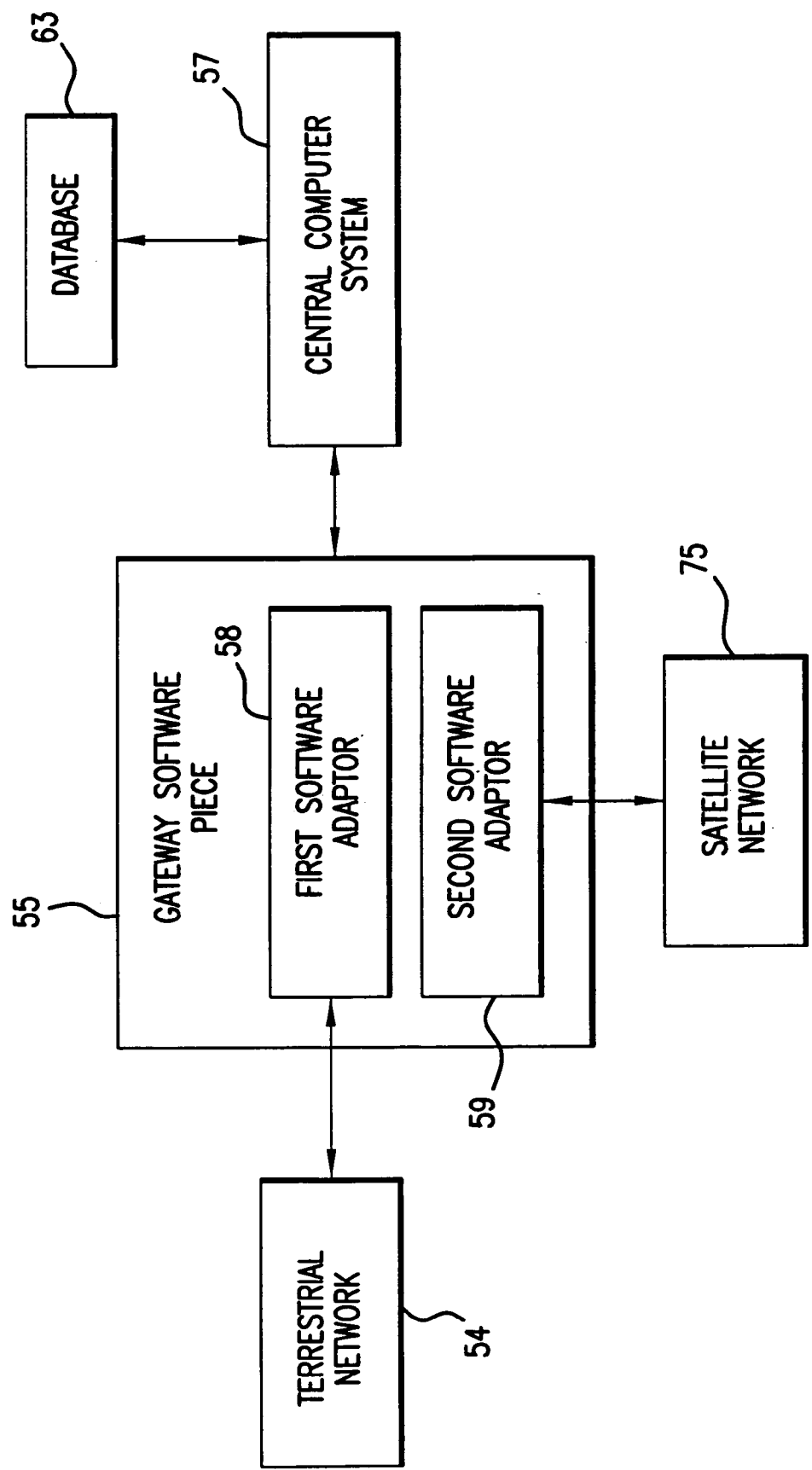
FIG. 3B is a schematic drawing of a gateway software piece according to an embodiment of the present invention.

FIG. 3B is a schematic drawing of an embodiment of the gateway software piece 55 of FIG. 3A. The gateway software piece 55 includes a first software adapter 58 and a second software adapter 59. The first software adapter 58 receives and processes incoming data packets from a point-of-presence (POP) of the terrestrial network 54, and reformats the processed data in a predetermined format. The format is compatible with that of the database 63 or another such database used by the central computer system 57. In an embodiment, the reformatted data is stored in the database 63 or other memory locations.

The second software adapter 59 receives and processes incoming data packets from a POP of the satellite network 75, and reformats the processed data in the same format used by the first software adapter 58 for incoming data packets. The reformatted data may be stored in the database 63.

The first software adapter 58 may also format outgoing data packets from the central computer system 57 in a format associated with the terrestrial network 54. Similarly, the second software adapter 59 may format outgoing data packets in a format associated with the satellite network 75. In an embodiment, the gateway software piece 55 may select the terrestrial network 54 or satellite network 75 for data transmission applying similar processes as those applied in the wireless appliance 10.

FIG. 4 shows a sample web page 130 included in the website of FIG. 3A, for example, that displays diagnostic data collected from the ECU of a particular vehicle as described above. The web page 130 includes a set of diagnostic data 131 and features fields listing, for example, an acronym 132, value and units 134, and brief description 136 for each datum. During typical operation, the wireless appliance automatically transmits sets of diagnostic data 131 like the one shown in FIG. 3A at periodic intervals, e.g. every 20 to 40 minutes. The wireless appliance can also transmit similar data sets at random time intervals or in response to a query from the host computer system (sometimes called a ping).

Figure 5A:
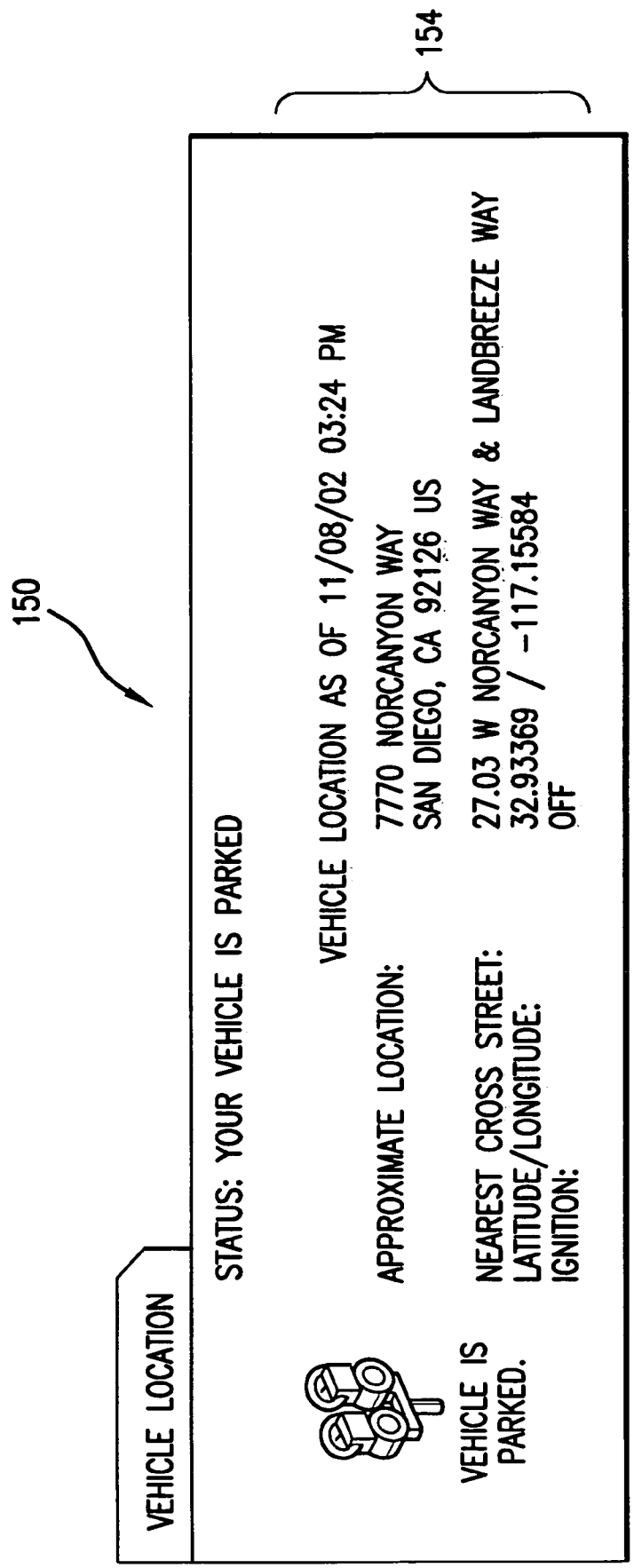
FIGS. 5A and 5B are web pages displaying, respectively, screen captures of a vehicle's numerical latitude and longitude and a map showing the vehicle's location monitored by the wireless appliance of FIG. 1 according to an embodiment of the present invention.
Figure 5B:
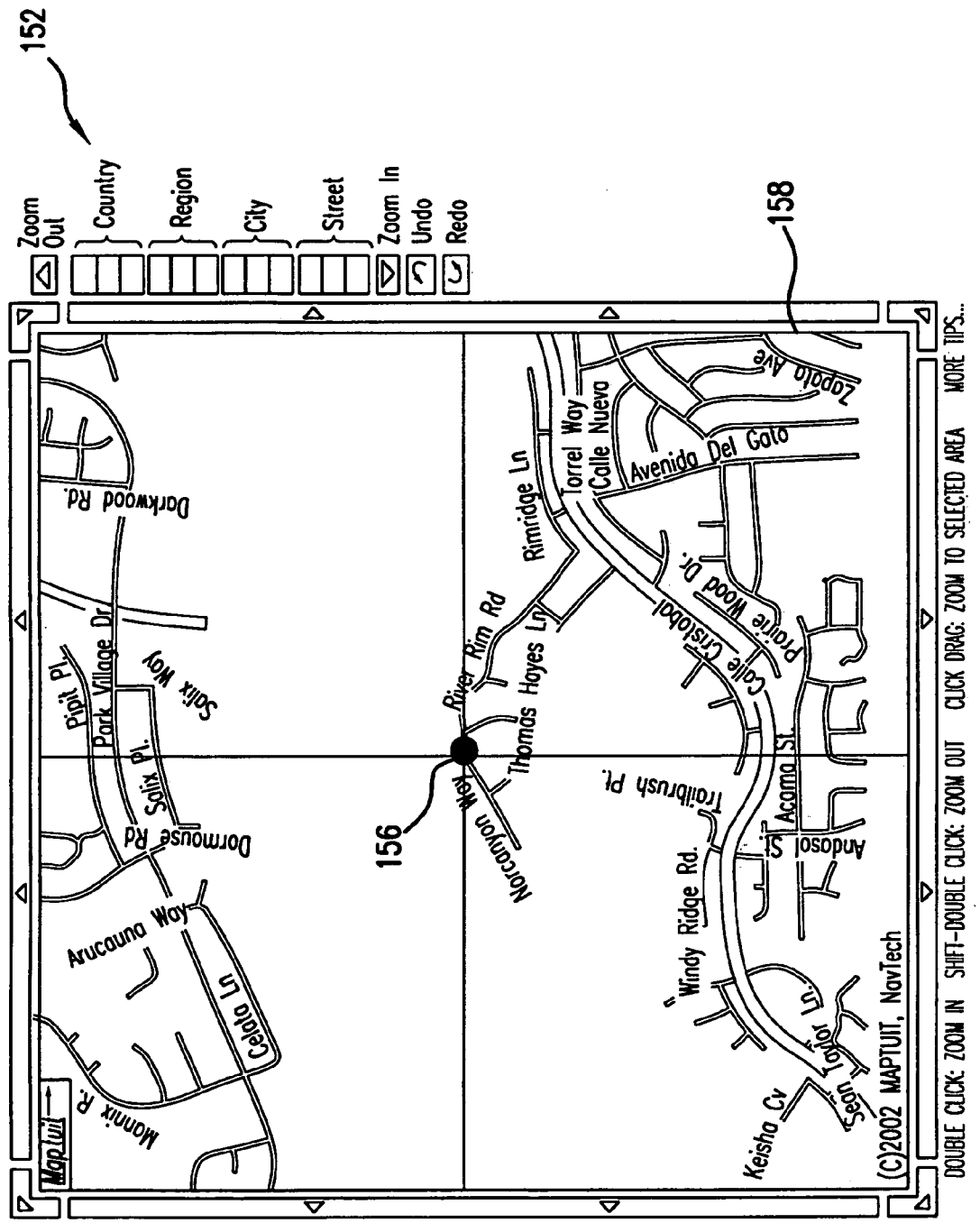

FIGS. 5A and 5B show sample web pages 150, 152 included in the website of FIG. 3A, for example, that display, respectively, GPS data 154 and a map 158 that together indicate a vehicle's location 156. In this case, the GPS data 154 include the vehicle's latitude, longitude, and a reverse geocode of these data indicating a corresponding street address, the nearest cross street, and a status of the vehicle's ignition (i.e., 'on' or 'off' and whether or not the vehicle is parked or moving). The map 158 displays these coordinates in a graphical form relative to an area of, in this case, a few square miles. In typical embodiments, the web pages 150, 152 are rendered each time the GPS data are periodically transmitted from a vehicle (e.g., every 1–2 minutes) and received by the data-processing component of the website. Both the map and a database that translates the latitude and longitude into a reverse geocode are accessible though an Internet-based protocol, e.g. XML, Web Services, or TCP/IP. Companies such as MapTuit, MapQuest, and NavTech support software that provides such maps and databases. Alternatively, software for mapping or geocoding the GPS data may be hosted on a user's personal computer.

Figure 6:
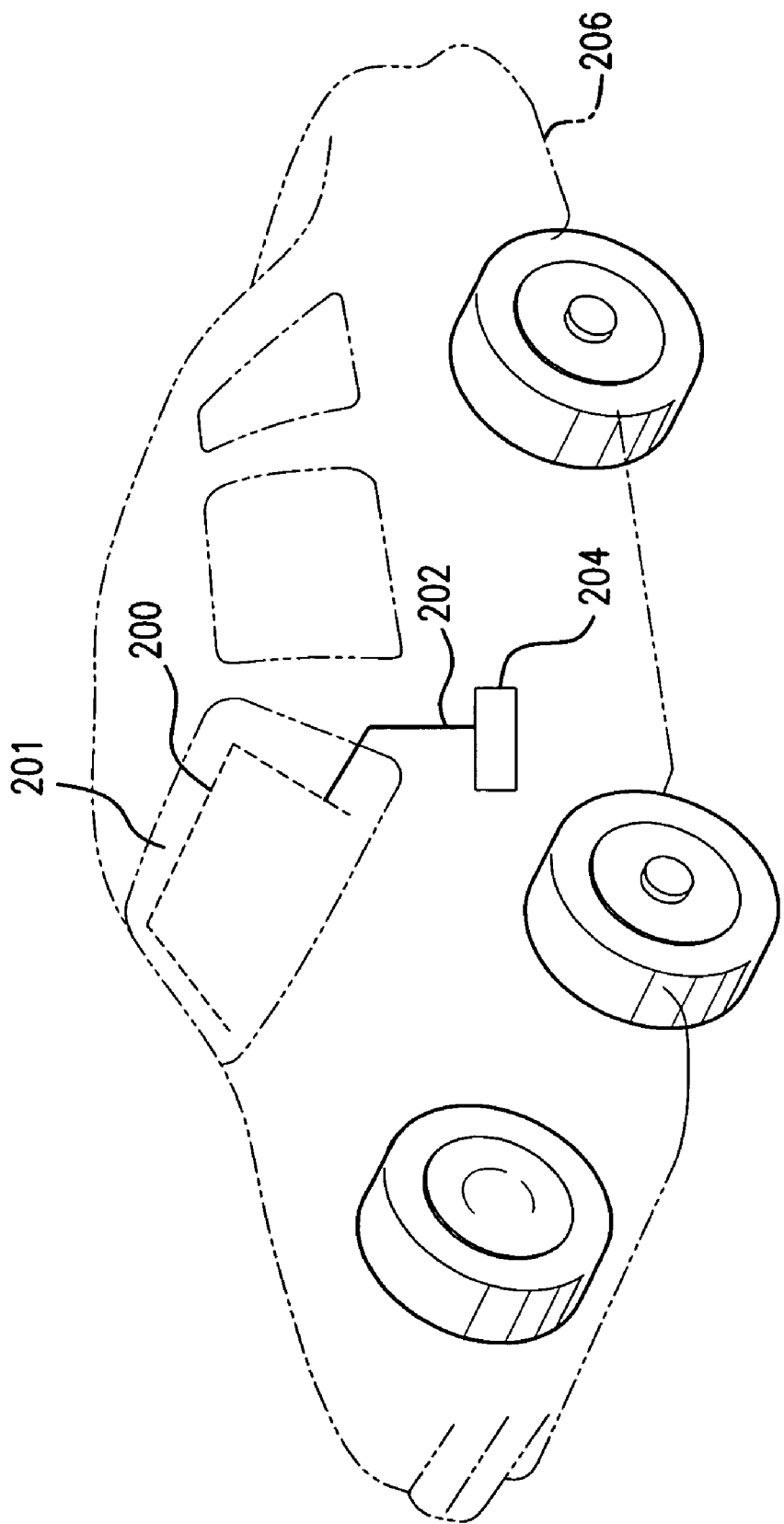
FIG. 6 is a schematic drawing of a satellite-based wireless appliance installed in a host vehicle according to an embodiment of the present invention.

FIG. 6 is a schematic drawing of a satellite-based wireless appliance 204 installed in a host vehicle 206 according to another embodiment of the present invention. The wireless appliance 204 may include some or all the features of the device shown in FIGS. 1 and 2 above, and additionally uses a patch antenna 200 adhered to the vehicle's windshield 201. Alternatively, the patch antenna 200 is embedded in the glass of the windshield 201. The antenna 200 transmits and receives data over the satellite network, which typically operates at about 150 MHz. An electrical lead 202 connects the patch antenna 200 to the wireless appliance 204. In this configuration, the antenna 200 is concealed within the vehicle, making the wireless appliance 204 an effective tool for recovering a stolen vehicle.

Figure 7:
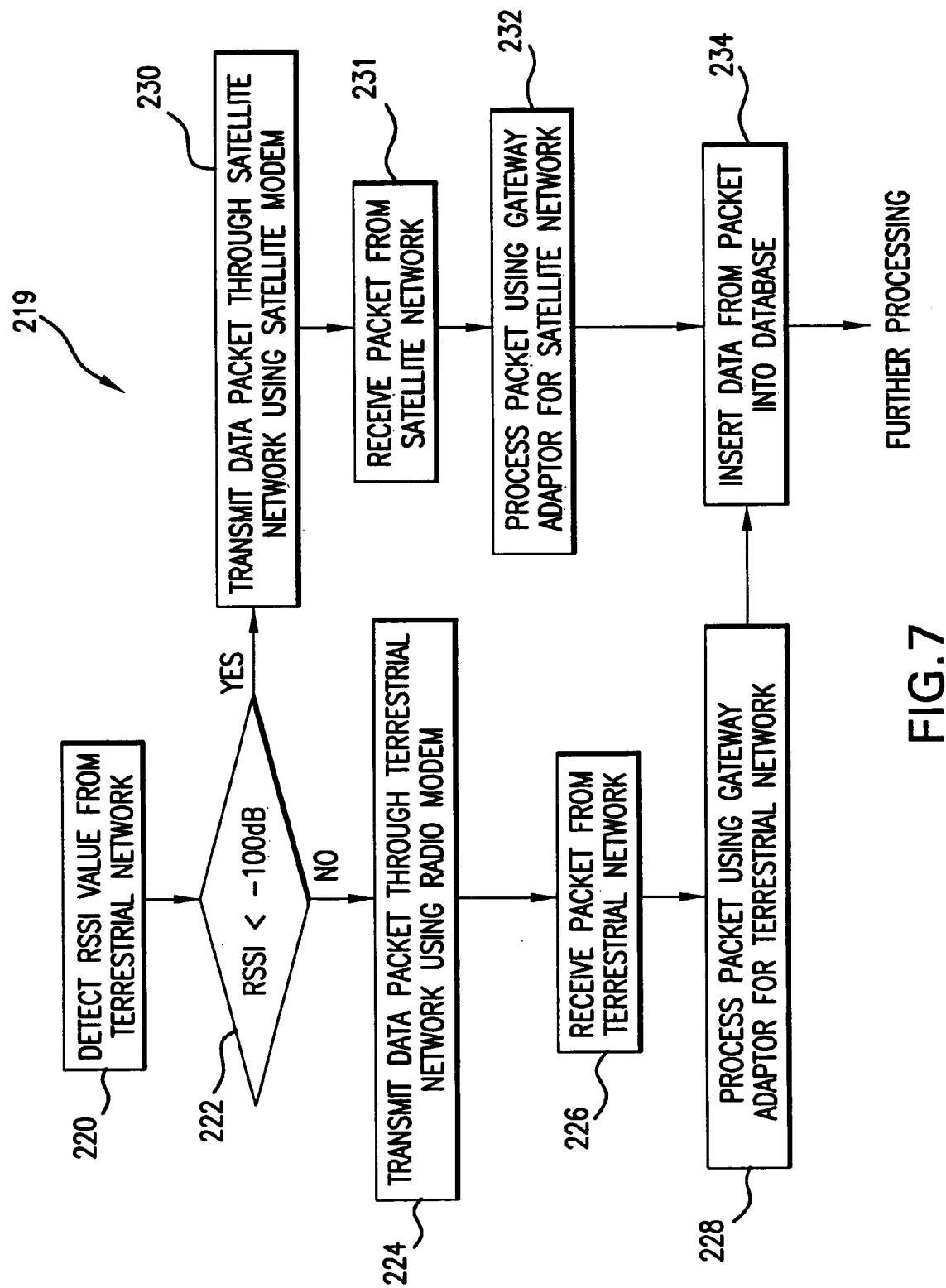
FIG. 7 is a flowchart of a process used by a wireless appliance to select a network for transmitting diagnostic and/or location-based data packets according to an embodiment of the present invention.

FIG. 7 is a flowchart of a process 219 used by the wireless appliance of FIGS. 1 and 2 for selecting a network by which to transmit diagnostic and/or location-based data packets according to an embodiment of the present invention. In task 220, the radio modem determines a signal strength, or 'RSSI' value, for transmitting data over the terrestrial network. The radio modem may determine the RSSI value by detecting a signal through its antenna and analyzing the signal with an internal electronics system. The process determines if the RSSI is less than −100 dB (task 222).

If the RSSI value is less than this value, indicating a weak signal that is inadequate for transmitting data, the process transmits the data packet through the satellite network using the satellite modem (task 230). In this case, the satellite network receives the data packet (task 231) and sends it to a data center. The data center routes the packet to a gateway software piece located at an IP address included in the packet's header. The gateway software piece includes a section of computer code, called an adaptor, which processes the packet from the satellite network (task 232). Processing typically involves parsing the packet to remove data from its payload and the host vehicle's identification from its header. Using this information, the process then inserts the data in the appropriate location in a database (task 234) for further processing.

Alternatively, an RSSI value greater than −100 dB indicates that the terrestrial network is adequate to transmit the packet. In this case, the process transmits the packet through the terrestrial network using the radio modem (task 224). The terrestrial network receives the packet (task 226) and, similar to before, routes it to the gateway software piece described above where it is processed with a second adaptor (task 228). The adaptor parses the payload and vehicle identification from the packet and inserts the data in the database (task 234) for further processing.

Figure 8:
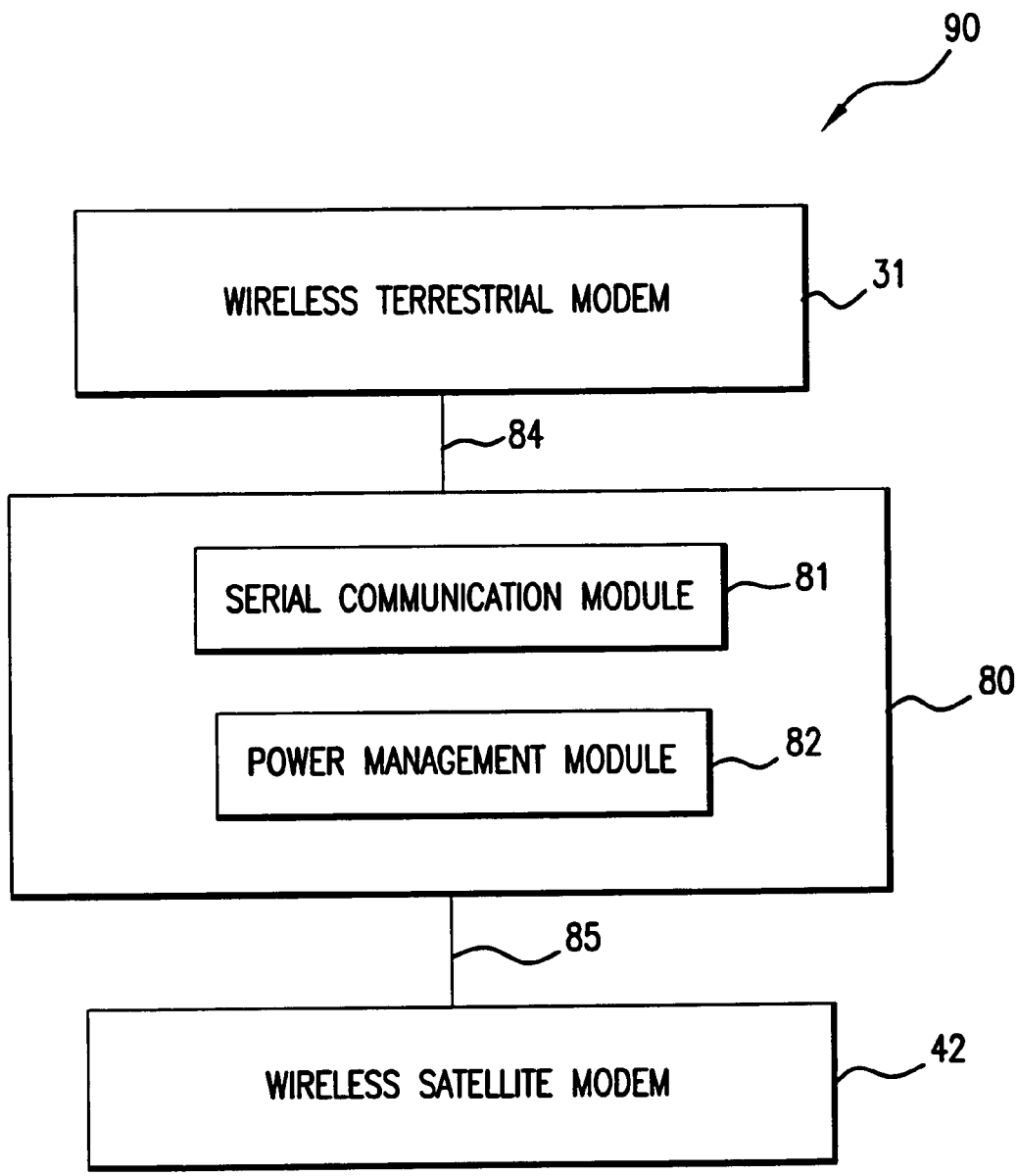
FIG. 8 is a schematic drawing of a wireless appliance according to an embodiment of the present invention featuring an interface board that connects a terrestrial modem to a satellite modem.

FIG. 8 is a schematic drawing of a wireless appliance 90 according to another embodiment of the present invention. The wireless appliance 90 features an interface board 80 that connects through a first cable 84 to a wireless terrestrial modem 31, and through a second cable 85 to a wireless satellite modem 42. The interface board 80 is typically a stand-alone unit that enables the wireless appliance 90 to use the satellite modem 42 as a fail-over transmission system as described above. Both the terrestrial modem 31 and satellite modem 42 typically connect to other electrical modules, such as those shown in FIG. 2 but not indicated in FIG. 8, in order to wirelessly transmit diagnostic and location-based data from a host vehicle.

The interface board 80 allows the satellite modem 42 to be easily connected and disconnected from the terrestrial modem 31 and its associated electronics. For example, the satellite modem 42 may be disconnected from the wireless appliance 90 during a manufacturing process if the appliance is fabricated for a customer based in a region that features adequate terrestrial wireless coverage. Alternatively, the satellite modem may be connected to the appliance during manufacturing if the customer is in a remote area that does not feature adequate terrestrial wireless coverage, and thus requires satellite coverage.

The interface board 80 features a serial communication module 81 that manages communication between the terrestrial modem 31 and the satellite modem 42. During operation, for example, the serial communication module 81 collects data sent from the wireless terrestrial modem 31 through the first cable 84 via a serial communication protocol (e.g., RS232). If necessary, the serial communication module 81 converts the serial communication protocol to one that is accepted by the satellite modem 42 (e.g., TTL), and then sends the data through the second cable 85 to the satellite modem 42. The data are then transmitted as described above. If no conversion is necessary, the serial communication module 81 relays the data from the terrestrial modem 31 to the satellite modem 42.

The interface board 80 additionally may include a power management module 82 that receives power from the power supply (39 in FIG. 2) associated with terrestrial modem 31 and converts it into power required for the satellite modem 42. For example, the satellite modem typically requires conditioned 12 volts, and can draw as much as 3 amps during a transmission. During operation, the power management module 82 converts input power into this load in order to operate the satellite modem.

Other embodiments are also within the scope of the invention. In particular, a variety of algorithms can be used to determine if data should be transmitted over the terrestrial or satellite networks. For example, the wireless appliance may include a pre-programmed table in its memory module that correlates the vehicle's location (e.g., latitude and longitude) with the coverage of the satellite and terrestrial networks. In this case, the microprocessor analyzes the GPS data, refers to the pre-programmed table to determine the appropriate network for transmission, and then transmits the data. In other embodiments, the microprocessor simultaneously transmits data over both networks.

The satellite modem can be attached to the wireless appliance using a variety of configurations. For example, the satellite modem can be included within a housing that contains the wireless appliance. Alternatively, the satellite modem can be external to the appliance and attached using a serial cable. In other embodiments, the wireless appliance can include an auxiliary port into which the satellite modem plugs.

In other embodiments, the respective software adaptor for the satellite or terrestrial networks may receive packets through Internet-based protocols (e.g., TCP/IP), or through a private network (e.g., a frame-relay circuit). Alternatively, the software adaptor may receive the packets through conventional e-mail.

In still other embodiments, the satellite modem and/or terrestrial modem may be fabricated directly on a motherboard included in the wireless appliance. In this case, a reference design describing the modem is incorporated into the overall design of the motherboard.

A variety of logic diagrams and corresponding circuits can be used to implement protocols such as J1850 PWM/VPWM, ISO 9141-2, CAN, KWP2000, and J1708. These protocols can be implemented using integrated silicon-based solutions (e.g., a custom ASIC), or using transistors or conventional circuit elements. Similarly, hardware architectures other than those described above can be used for a wireless appliance. For example, the ARM7 microprocessor used to run the appliance's firmware may be contained within the GPS module or a wireless modem. Or a different microprocessor, such as an Intel-based X86 or Pentium processor, may be used. And the antennae for both the satellite and terrestrial modems and the GPS module can be implemented using different configurations. In one embodiment, for example, all antennae may be implemented as discrete circuits directly onto a circuit board. Similarly, active antennae, which are conventionally used for GPS, may also be used for the radio antenna connected to a wireless modem. In another embodiment, the internal battery may include a solar cell.

In another embodiment, the wireless appliance includes devices that transmit data over local wireless networks, such as 802.11b or Bluetooth-based networks. For example, the wireless appliance may communicate using Bluetooth with a driver's cellular telephone. In this case, the wireless appliance may include hardware and software so that the wireless appliance functions as a hands-free kit that allows the driver to talk on the cellular telephone without actually holding the telephone.

In yet another embodiment, a wiring harness may be used to attach the wireless appliance to the host vehicle's diagnostic connector. This allows the wireless appliance to be hidden in the vehicle, thereby making the device effective for recovery of stolen vehicles.

The packets described above may be transmitted at pre-set time intervals (e.g., every 20 minutes for diagnostic data; every minute for GPS data). Alternatively or additionally, the transmission may be performed when authorized by a user of the system (e.g., using a button on the website). In still other embodiments, the transmission is performed when a data parameter (e.g., engine coolant temperature or a vehicle's location) exceeds or roams outside of a predetermined value. Or a third party, such as a call center, may prompt transmission and/or analysis of data.

In other embodiments, the modem used to transmit GPS data may employ a terrestrial GPS system, such as a network-assisted GPS available on chipsets designed by Qualcomm, Inc. In this case GPS data is determined by processing data from both satellites and terrestrial base stations. In other embodiments, the GPS system may process signals generated by analog or digital television transmitters to determine the vehicle's location. In addition, the wireless appliance may be interfaced to other sensors deployed in the vehicle to monitor additional data. For example, sensors for measuring tire pressure and temperature may be deployed in the vehicle and interfaced to the appliance so that data relating the tires' performance can be transmitted to the host computer system. These data can then be further analyzed along with the diagnostic and GPS data. Accelerometers can also be used as sensors to detect collisions. In other embodiments, the appliance may include I/O hardware to process analog or digital signals from a heavy-duty vehicle. For example, the appliance can process an analog signal from a "bucket truck" to determine the time period that the hydraulic bucket is raised. This time period can then be sent wirelessly to the central computer system as described above.

In still other embodiments, other location-based applications can be combined with the above-mentioned mapping capabilities to provide real-time internet-based services involving maps. For example, data indicating traffic can be combined with mapping software to generate internet-based, real-time traffic maps that graphically indicate traffic patterns. In this case data such as vehicle speed can be generated and transmitted by the in-vehicle wireless appliance described above. These data can also be used, for example, to generate an optimum travel route that minimizes traffic delays. Similarly, algorithms used to calculate vehicle emissions can be combined with the mapping software to generate real-time emissions maps that graphically indicate pollutants such as oxides of nitrogen, carbon monoxide, or hydrocarbon emissions. Additionally, algorithms for routing vehicles to a target destination may be used with the mapping software.

The foregoing description of the various embodiments of the present invention is provided to enable any person skilled in the art to make and use the present invention and its embodiments. Various modifications to these embodiments are possible, and the generic principles presented herein may be applied to other embodiments as well.

For instance, in still other embodiments, the above-described system is used to locate vehicles or things other than cars and trucks, such as industrial equipment or shipping containers.

Further, some embodiments of the present invention may be implemented in part or in whole as a hard-wired circuit, as a circuit configuration fabricated into an application-specific integrated circuit, or as a firmware program loaded into non-volatile storage, or a software program loaded from or into a data storage medium as machine-readable code. Such machine-readable code may include instructions executable by an array of logic elements, such as a microprocessor or other digital signal-processing unit.

It will be apparent to one of ordinary skill in the art that some of the embodiments as described hereinabove may be implemented in many different embodiments of software, firmware, and hardware in the entities illustrated in the figures. The actual software code or specialized control hardware used to implement some of the present embodiments is not limiting of the present invention. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Moreover, the processes associated with some of the present embodiments may be executed by programmable equipment, such as computers. Software that may cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable medium at a later date. Such a medium may include any of the forms listed above with respect to storage devices and may further include, for example, a carrier wave modulated, or otherwise manipulated, to convey instructions that can be read, demodulated/decoded and executed by a computer.

It can be appreciated, for example, that some process aspects described herein may be performed, in certain embodiments, using instructions stored on a computer-readable medium or media that direct a computer system to perform the process aspects. A computer-readable medium can include, for example, memory devices such as diskettes, compact discs of both read-only and writeable varieties, optical disk drives, and hard disk drives. A computer-readable medium can also include memory storage that can be physical, virtual, permanent, temporary, semi-permanent and/or semi-temporary. A computer-readable medium can further include one or more data signals transmitted on one or more carrier waves.

A "computer" or "computer system" may be, for example, a wireless or wireline variety of a microcomputer, minicomputer, laptop, personal data assistant (PDA), wireless e-mail device (e.g., BlackBerry), cellular phone, pager, processor, or any other programmable device, which devices may be capable of configuration for transmitting and receiving data over a network. Computer devices disclosed herein can include memory for storing certain software applications used in obtaining, processing and communicating data. It can be appreciated that such memory can be internal or external. The memory can also include any means for storing software, including a hard disk, an optical disk, floppy disk, ROM (read only memory), RAM (random access memory), PROM (programmable ROM), EEPROM (electrically erasable PROM), and other computer-readable media.

It is to be understood that the figures and descriptions of the present invention have been simplified to illustrate elements that are relevant for a clear understanding of the present invention, while eliminating, for purposes of clarity, other elements. Those of ordinary skill in the art will recognize that these and other elements may be desirable. However, because such elements are well known in the art, and because they do not facilitate a better understanding of the present invention, a discussion of such elements is not provided herein.

In some embodiments of the present invention disclosed herein, a single component can be replaced by multiple components, and multiple components replaced by a single component, to perform a given function or functions. Except where such substitution would not be operative to practice embodiments of the present invention, such substitution is within the scope of the present invention.

What is claimed is:

1. A wireless appliance for monitoring a vehicle, comprising:
    (a) a microprocessor configured to select a vehicle-communication protocol used within a host vehicle and communicate with the host vehicle through the vehicle-communication protocol, wherein the vehicle-communication protocol is selected based on a vehicle type of the host vehicle;
    (b) a vehicle-communication circuit, in electrical communication with the microprocessor, configured to collect diagnostic data from the host vehicle using the vehicle-communication protocol;
    (c) a GPS module, in electrical communication with the microprocessor, configured to generate location-based data;
    (d) a first wireless transmitter operating on a terrestrial network and configured to receive and transmit data generated by the GPS module and collected by the vehicle-communication circuit;

(e) a second wireless transmitter operating on a satellite network and configured to receive and transmit data generated by the GPS module and collected by the vehicle-communication circuit; and (f) a single chipset that comprises the GPS module and the first and second wireless transmitters, wherein the microprocessor is further configured to determine at least one of coverage associated with the terrestrial network and coverage associated with the satellite network, and wherein the microprocessor is further configured to select the first or second wireless transmitter to transmit the diagnostic and location-based data.

2. A wireless appliance for monitoring a vehicle, comprising:

(a) a microprocessor configured to select a vehicle-communication protocol used within a host vehicle and communicate with the host vehicle through the vehicle-communication protocol, wherein the vehicle-communication protocol is selected based on a vehicle type of the host vehicle;

(b) a vehicle-communication circuit, in electrical communication with the microprocessor, configured to collect diagnostic data from the host vehicle using the vehicle-communication protocol;

(c) a first wireless transmitter operating on a terrestrial network and configured to receive and transmit data collected by the vehicle-communication circuit;

(d) a second wireless transmitter operating on a satellite network and configured to receive and transmit data collected by the vehicle-communication circuit, wherein the microprocessor is further configured to select the first or second wireless transmitter to transmit the diagnostic data; and (e) a single chipset that comprises the first and second wireless transmitters.

3. The wireless appliance of claim 2, further comprising:

(a) a GPS module, in electrical communication with the microprocessor, configured to generate location-based data, wherein the first wireless transmitter is further configured to receive and transmit data generated by the GPS module, wherein the second wireless transmitter is further configured to receive and transmit data generated by the GPS module, and wherein the microprocessor is further configured to select the first or second wireless transmitter to transmit the location-based data.

4. The wireless appliance of claim 3, further comprising:

(a) a GPS antenna in electrical contact with the GPS module;

(b) radio antennas in electrical contact with the respective first and second wireless transmitters; and (c) a single housing that houses the GPS antenna, the radio antennas, the microprocessor, the vehicle-communication circuit, the GPS module, and the first and second wireless transmitters.

5. The wireless appliance of claim 3, wherein the single chipset further comprises the GPS module.

6. The wireless appliance of claim 2, wherein the microprocessor is further configured to determine at least one of coverage associated with the terrestrial network and coverage associated with the satellite network.

7. The wireless appliance of claim 6, wherein the first wireless transmitter is selected if coverage associated with the terrestrial network satisfies at least one sufficiency criterion.

8. The wireless appliance of claim 6, wherein the second wireless transmitter is selected if coverage associated with the terrestrial network does not satisfy at least one sufficiency criterion.

9. The wireless appliance of claim 6, wherein the microprocessor is further configured to analyze at least one of radio-frequency signal strengths associated with the terrestrial network and radio-frequency signal strengths associated with the satellite network.

10. The wireless appliance of claim 6, wherein the microprocessor is further configured to access at least one memory module including coverage information associated with at least one of the terrestrial network and the satellite network.

11. The wireless appliance of claim 10, wherein the coverage information is provided in a programmed table arranged to correlate vehicle-location information and coverage information.

12. The wireless appliance of claim 2, wherein the first and second wireless transmitters are configured to at least in part simultaneously transmit data.

13. The wireless appliance of claim 2, wherein the host vehicle is selected from a group comprising an automobile, truck, wheeled commercial equipment, medium-duty truck, heavy-duty truck, construction vehicle, power sport vehicle, collision repair vehicle, marine vehicle, and recreational vehicle.

14. The wireless appliance of claim 2, wherein the wireless appliance is configured to query an engine control unit (ECU) of the vehicle.

15. The wireless appliance of claim 2, further comprising an internal battery.

16. The wireless appliance of claim 15, wherein the internal battery includes a solar cell.

17. The wireless appliance of claim 15, further comprising a power-conditioning circuit configured to be in electrical communication with the internal battery and a power source of the vehicle.

18. The wireless appliance of claim 2, wherein at least one of the first and second transmitters comprises a wireless modem.

19. The wireless appliance of claim 18, wherein the wireless modem utilizes an active antenna.

20. The wireless appliance of claim 18, further comprising a modem adaptor configured to interface the microprocessor and the wireless modem.

21. The wireless appliance of claim 2, wherein the vehicle-communication circuit is configured to be interfaced with a diagnostic connector in the vehicle.

22. The wireless appliance of claim 21, wherein the wireless appliance is configured to receive power, at least in part, via the diagnostic connector.

23. The wireless appliance of claim 21, wherein the diagnostic connector is an OBD-II connector.

24. The wireless appliance of claim 21, wherein the diagnostic connector is a J1708 connector.

25. The wireless appliance of claim 21, wherein the wireless appliance is configured to be attached to the diagnostic connector via a wiring harness.

26. The wireless appliance of claim 2, wherein the wireless appliance is configured to be interfaced with at least one sensor in the vehicle.

27. The wireless appliance of claim 26, wherein the at least one sensor comprises a tire pressure or temperature sensor.

28. The wireless appliance of claim 26, wherein the at least one sensor comprises an accelerometer.

29. The wireless appliance of claim 2, wherein the wireless appliance is configured to be directly interfaced with an electrical system of the vehicle.

30. The wireless appliance of claim 2, wherein the single chipset comprises an ASIC.

31. The wireless appliance of claim 2, wherein the vehicle-communication circuit includes modules that each manage a vehicle-communication protocol.

32. The wireless appliance of claim 31, wherein a module in the vehicle-communication circuit comprises a circuit configured to support at least one of the J1850 PWM, J1850 VPWM, ISO 9141-2, CAN, Keyword 2000, and J1708 vehicle-communication protocols.

33. The wireless appliance of claim 2, wherein the wireless appliance is configured to transmit data over at least one local wireless network.

34. The wireless appliance of claim 33, wherein the at least one local wireless network is a Bluetooth-based network.

35. The wireless appliance of claim 2, wherein the microprocessor is further configured to at least attempt communication using the first wireless transmitter before the second wireless transmitter.

36. A monitorable vehicle, comprising:
 (a) a vehicle including an on-board diagnostic system configured to query data relating to the vehicle; and
 (b) a wireless appliance, comprising,
  (i) a microprocessor configured to select a vehicle-communication protocol used within the vehicle and communicate with the vehicle through the vehicle-communication protocol, wherein the vehicle-communication protocol is selected based on a vehicle type of the host vehicle;
  (ii) a vehicle-communication circuit, in electrical communication with the microprocessor, configured to collect diagnostic data from the vehicle using the vehicle-communication protocol, wherein the vehicle-communication circuit is interfaced with the on-board diagnostic system;
  (iii) a first wireless transmitter operating on a terrestrial network and configured to receive and transmit data collected by the vehicle-communication circuit;
  (iv) a second wireless transmitter operating on a satellite network and configured to receive and transmit data collected by the vehicle-communication circuit,
  wherein the microprocessor is further configured to select the first or second wireless transmitter to transmit the diagnostic data; and
  (v) a single chipset that comprises the first and second wireless transmitters.

37. The monitorable vehicle of claim 36, wherein the vehicle is selected from a group comprising an automobile, truck, wheeled commercial equipment, medium-duty truck, heavy-duty truck, construction vehicle, power sport vehicle, collision repair vehicle, marine vehicle, and recreational vehicle.

38. The monitorable vehicle of claim 36, wherein the vehicle-communication circuit is interfaced with the on-board diagnostic system via a diagnostic connector.

39. The monitorable vehicle of claim 38, wherein the wireless appliance is attached to the diagnostic connector via a wiring harness.

40. The monitorable vehicle of claim 36, wherein the vehicle-communication circuit is directly interfaced with an electrical system of the vehicle.

41. The monitorable vehicle of claim 36, wherein the wireless appliance further comprises:
 (i) a GPS module, in electrical communication with the microprocessor, configured to generate location-based data,
 wherein the first wireless transmitter is further configured to receive and transmit data generated by the GPS module,
 wherein the second wireless transmitter is further configured to receive and transmit data generated by the GPS module, and
 wherein the microprocessor is further configured to select the first or second wireless transmitter to transmit the location-based data.

42. The monitorable vehicle of claim 41, wherein the wireless appliance further comprises:
 (i) a GPS antenna in electrical contact with the GPS module;
 (ii) radio antennas in electrical contact with the respective first and second wireless transmitters; and
 (iii) a single housing that houses the GPS antenna, the radio antennas, the microprocessor, the vehicle-communication circuit, the GPS module, and the first and second wireless transmitters.

43. A wireless appliance for monitoring a vehicle, comprising:
 (a) a microprocessor including firmware configured to select a vehicle-communication protocol used within a host vehicle and communicate with the host vehicle using the vehicle-communication protocol, wherein the vehicle-communication protocol is selected based on a vehicle type of the host vehicle;
 (b) a vehicle-communication circuit, in electrical communication with the microprocessor, configured to collect diagnostic data from the host vehicle using the vehicle-communication protocol, wherein the vehicle-communication circuit is configured to support multiple different vehicle-communication protocols;
 (c) a first wireless transmitter operating on a terrestrial network and configured to receive and transmit data collected by the vehicle-communication circuit;
 (d) a second wireless transmitter operating on a satellite network and configured to receive and transmit data collected by the vehicle-communication circuit,
 wherein the firmware is further configured to select the first or second wireless transmitter to transmit the diagnostic data, and
 wherein the firmware is further configured to at least attempt communication using the first wireless transmitter before the second wireless transmitter; and
 (e) a single chipset that comprises the first and second wireless transmitters.

44. The wireless appliance of claim 43, wherein the firmware is further configured to determine at least one of coverage associated with the terrestrial network and coverage associated with the satellite network.

45. The wireless appliance of claim 44, wherein the first wireless transmitter is selected if coverage associated with the terrestrial network satisfies at least one sufficiency criterion.

46. The wireless appliance of claim 44, wherein the second wireless transmitter is selected if coverage associated with the terrestrial network does not satisfy at least one sufficiency criterion.

47. The wireless appliance of claim 44, wherein the firmware is further configured to analyze at least one of radio-frequency signal strengths associated with the terrestrial network and radio-frequency signal strengths associated with the satellite network.

48. The wireless appliance of claim 44, wherein the firmware is further configured to access at least one memory module including coverage information associated with at least one of the terrestrial network and the satellite network.

49. The wireless appliance of claim 48, wherein the coverage information is provided in a programmed table arranged to correlate vehicle-location information and coverage information.

50. The wireless appliance of claim 43, wherein the first and second wireless transmitters are configured to at least in part simultaneously transmit data.

51. The wireless appliance of claim 43, further comprising:
- (a) a GPS module, in electrical communication with the microprocessor, configured to generate location-based data,
- wherein the first wireless transmitter is further configured to receive and transmit data generated by the GPS module,
- wherein the second wireless transmitter is further configured to receive and transmit data generated by the GPS module, and
- wherein the firmware is further configured to select the first or second wireless transmitter to transmit the location-based data.

52. A wireless appliance for monitoring a vehicle, comprising:
- (a) a microprocessor configured to select a vehicle-communication protocol used within a host vehicle and communicate with the host vehicle through the vehicle-communication protocol, wherein the vehicle-communication protocol is selected based on a vehicle type of the host vehicle;
- (b) a vehicle-communication circuit, in electrical communication with the microprocessor, configured to collect diagnostic data from the host vehicle using the vehicle-communication protocol;
- (c) a satellite modem operating on a satellite network and configured to receive and transmit data collected by the vehicle-communication circuit;
- (d) an antenna connected to the satellite modem;
- (e) a terrestrial modem operating on a terrestrial network and configured to receive and transmit data collected by the vehicle-communication circuit,
- wherein the microprocessor is further configured to select the satellite modem or terrestrial modem to transmit the diagnostic data, and
- wherein the microprocessor is further configured to at least attempt communication using the terrestrial modem before the satellite modem; and
- (f) a single chipset that comprises the satellite and terrestrial modems.

53. The wireless appliance of claim 52, further comprising:
- (a) a GPS module, in electrical communication with the microprocessor, configured to generate location-based data,
- wherein the satellite modem is further configured to receive and transmit data generated by the GPS module,
- wherein the terrestrial modem is further configured to receive and transmit data generated by the GPS module, and
- wherein the microprocessor is further configured to select the satellite modem or terrestrial modem to transmit the location-based data.

* * * * *